UNITED STATES PATENT OFFICE.

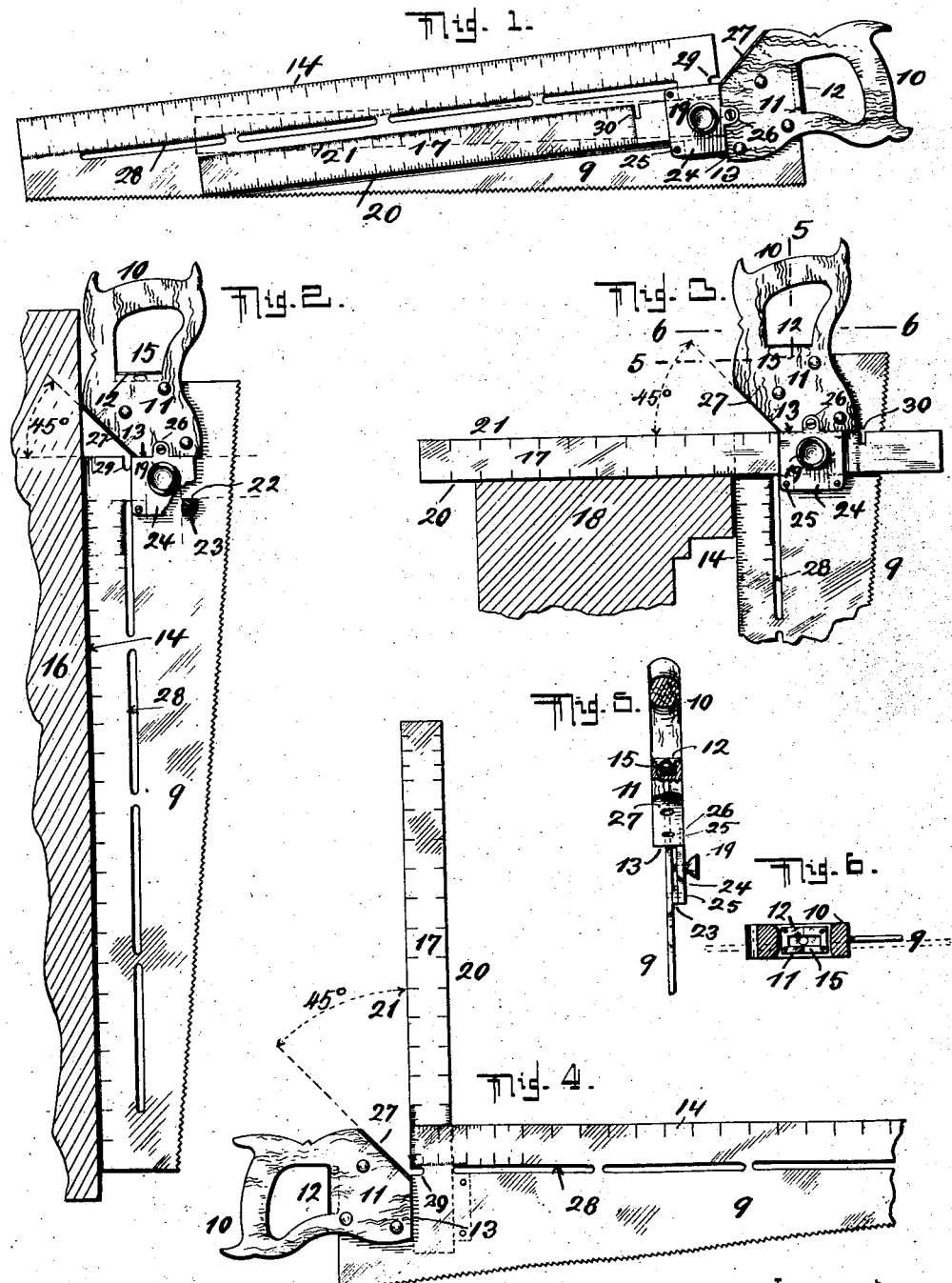

HARRISON A. HAMILTON, OF MYERS, KENTUCKY.

COMBINATION-TOOL.

No. 814,039.

Specification of Letters Patent.

Patented March 6, 1906.

Application filed December 24, 1904. Serial No. 238,193.

*To all whom it may concern:*

Be it known that I, HARRISON A. HAMILTON, a citizen of the United States, residing at Myers, Nicholas county, State of Kentucky, have invented certain new and useful Improvements in Combination-Tools; and I do declare the following to be a full, clear, and exact description thereof, attention being called to the accompanying drawings, with the reference characters marked thereon, which form also a part of this specification.

This invention relates to certain new and useful improvements in combination-tools, and more particularly to one where a customary hand or rip saw forms the primary tool and which by a certain constructon and by certain attachments coöperating therewith, all as shown and hereinafter described, may also be used to perform the functions of certain other additional tools. These functions contemplate use as a mitering-angle or mitering-square to lay off angles of forty-five degrees and comprise also all the possible uses of a customary square, like a carpenter's or try square.

In the following specification and particularly pointed out in the claims is found a full description of the invention, together with manner of use, parts, and construction, which latter is also illustrated in the accompanying drawings, in which—

Figure 1 shows the entire implement complete, the adjustable attachment being held thereto merely to prevent its loss or misplacement, no use of any kind being here contemplated. Fig. 2 shows the implement in a condition permitting normal use of the saw. It may also be used as a plumb to ascertain the verticality of upright surfaces. Fig. 3 shows the implement adjusted and used as a mitering-angle. It may also be used as a level to test and ascertain horizontality of surfaces. Fig. 4 shows the other side of the implement and the same arranged and used as a try-square. Figs. 5 and 6 are sectional detail views, Fig. 5 being part of an edge view of the implement and section on line 5 5 of Fig. 3, and Fig. 6 is a horizontal section on line 6 6 of the same figure.

In the drawings, 9 indicates the saw-blade, 10 the handle, and 11 its shank whereby the same is attached to the broad end of the blade in the usual manner by screws or rivets. This shank is provided with two edges 12 and 13, which are arranged parallel to each other and at right angles to the back edge 14 of the saw-blade.

A leveling instrument 15 of customary construction is mounted on or embedded into edge 12 of shank 11 in a manner so as to be parallel to this edge, thus being also at right angles to edge 14 of the saw-blade. In this condition the implement may be used as a plumb to ascertain the verticality of an upright object or surface—as, for instance, as shown in Fig. 2 at 16.

By providing an arm 17 and mounting the same so as to be parallel to edge 12 and to level 15 the implement may be used as a leveling instrument to ascertain horizontality of surfaces—as is shown, for instance, at 18 in Fig. 3. To permit use of the implement as a saw, this arm 17 must be arranged removably, for which purpose I provide a socket which receives the same and in which it is detachably held by a set-screw 19. This arm is also used to form one of the limbs or members of the right angle which constitutes the try-square shown in Fig. 4, edge 14 of the saw-blade being the other member of this angle, and size and shape of this arm 17 are therefore arranged accordingly and with all these uses in view. This shape and size is that of a flat elongated rectangular blade with parallel longitudinal edges 20 and 21, and the above-mentioned socket is therefore arranged accordingly to form a guideway which may receive this blade and at the same time hold it firmly to its right-angular position with reference to edge 14 and to its parallelism with reference to edge 13 of shank 11 to serve in the first instance as a complementary part of the try-square shown in Fig. 4 and in the other instance as a constituent part of the leveling instrument shown in Fig. 3. This socket and guideway is constructed by using edge 13 of shank 11 as one of its sides and the alined surfaces 22 of two posts 23 as the other side, between which the edges of arm 17 closely fit when said arm is flatwise inserted. (See Figs. 2 and 3.) This guideway and socket is completed by using parts of the saw-blade, and it is closed outwardly by a cap 24, secured in place by attachment to posts 23 and to shank 11, the attachment being in any suitable way, as by screws, rivets, or other equivalent means. Screws 25 are shown as used, a lug 26 being provided at the point of attachment to shank 11. Set-screw 19 is also seated in this cap, but could equally as well be mounted in the saw-blade, the insertion being then from the opposite side.

It will now be seen that arm 17 is detachably held to the saw-blade and also adjustable in the direction of its length, the movement being a sliding one and closely fitted in a manner that at all times the arm preserves its proper angular relation with reference to edge 14 of the saw-blade, which means also parallelism with edge 12 of shank 11, upon all of which the use of the implement as a leveler and as a try-square depends.

By cutting a triangular notch in from back edge 14 of the saw-blade with one of its lines disposed at right angles to this back edge and in line with edge 13 and by cutting shank 11 away, as shown at 27, to form the other line and by finally shaping this notch so that this line or edge 27 forms also an angle of one hundred and thirty-five degrees with edge 13 of shank 11 or one of forty-five degrees with the other line of the notch or with arm 17 when this latter is inserted the implement may also be used as a mitering-square to measure and lay off angles of forty-five degrees, as best shown in Figs. 1, 2, 3, and 4. This edge 27 is preferably covered or lined by a metal plate or strip to protect the wood.

Of the square formed as shown in Fig. 4 either the inner or the outer angle may be used. The inner angle is formed by edge 14 of the saw-blade and by edge 20 of arm 17. The outer angle is formed by edge 21 of arm 17 and by an internal edge 28 on the saw-blade, which edge is obtained by slotting the saw-blade in the manner shown. All four edges are provided with suitable graduations and scales, showing, preferably, inches with customary subdivisions, the same as are used in regular carpenters' squares.

It is sometimes desirable for certain measurements and calculations that the graduations on both edges of the angle start from the vertex or point of the same. Therefore and in order to facilitate location of this point for such purpose or for any other I provide complementary notches, one, 29, in the saw-blade and one, 30, in arm 17, which for this intended purpose must register, arm 17 being adjusted accordingly by sliding in its guide-socket.

After use in any capacity and when neither the saw nor arm 17 are required this latter may be held to the saw merely to keep the parts compactly together by insertion between posts 23, as shown in Fig. 1, and in which position it is held by set-screw 19. This insertion should be such that no part of arm 17 projects beyond the area of the saw-blade, and it may be in either one of the positions as shown in Fig. 1, one position appearing in dotted lines.

Having described my invention, I claim as new—

1. In a combination-tool, the combination of a saw-blade, a handle for it, and a shank whereby the two are connected to each other, there being a triangular notch provided in the saw-blade adjacent to the shank of the handle and extending from the back edge of the saw-blade inwardly, one of the edges of this notch being arranged at right angles to the back edge of the saw-blade, the other edge of the notch forming an angle of forty-five degrees therewith, the edge of the handle-shank being shaped accordingly.

2. In a combination-tool, the combination of a saw-blade, a handle for it, a shank whereby both are connected, the inner edge 13 of said shank being arranged to be at right angles to the back of the saw-blade, a guideway formed on the side of the saw-blade and of which guideway, edge 13 forms one of the sides, an arm fitted to this guideway and means to hold it adjustably to its position therein.

3. In a combination-tool, the combination of a saw-blade, a handle for it, a shank whereby the two are connected and the inner edge 13 of which is arranged at right angles to the back edge of the saw-blade, a socket provided on the flat side of the saw and of which parts of this latter and edge 13 form parts, an arm fitted to this socket in a manner to be at right angles to the saw-blade, means to hold it detachably and removably in this socket and an angular notch provided in the saw-blade extending from the back edge inwardly, its two sides being arranged to form an angle of forty-five degrees and one of which sides being coincident and alined with one of the edges of the arm mentioned when the same occupies its socket.

4. In a combination-tool, the combination of a saw-blade, a handle for it, a shank whereby the two are connected and the inner edge 13 of which is arranged at right angles to the back edge of the saw-blade, a socket provided on the flat side of this latter and next to edge 13, an arm fitted to this socket which latter is open to permit insertion of this arm in two directions, the arrangement being such that when inserted from one direction, the arm is at right angles to the saw-blade, while when inserted from the other direction, said arm is held within the area of the saw-blade and means to hold this arm detachably and adjustably in this socket.

5. In a combination-tool, the combination of a saw-blade, a handle for it, a shank whereby the two are connected and the inner edge 13 of which is arranged at right angles to the back edge of the saw-blade, a socket provided on the flat side of this latter and next to edge 13 an arm fitted to this socket so as to be at right angles to the back of the saw-blade, means to hold this arm detachably in its socket and registering notches 29 and 30, one provided in the edge of the saw-blade and the other in one of the edges of the arm mentioned and serving for the purpose described.

6. In a combination-tool, the combination of a saw-blade, a handle for it, a shank whereby the two are connected and the inner edge 13 of which is arranged at right angles to the back edge of the saw-blade, a socket provided on the flat side of this latter and next to edge 13 an arm fitted to this socket in the manner to be arranged at right angles to the back of the saw-blade, to form therewith a right-angle square presenting for use an inner and an outer angle, the lines of said angles being provided by the edges of the arm mentioned and by edge 14 of the back of the saw-blade and notches 28 provided in this latter to provide the additional edge for the outer angle.

In testimony whereof I hereunto set my signature in the presence of two witnesses.

HARRISON A. HAMILTON.

Witneses:
C. SPENGEL,
ARTHUR KLINE.